Figure 1:
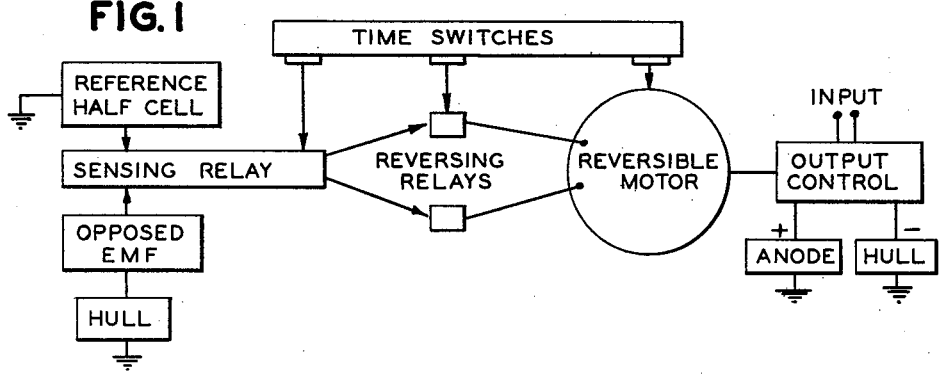

April 14, 1964           E. M. FRY           3,129,154

CATHODIC PROTECTION SYSTEM

Filed May 1, 1958

*INVENTOR.*
EUGENE M. FRY

BY Karl Huber
James E. Bryan
ATTORNEYS

3,129,154
CATHODIC PROTECTION SYSTEM
Eugene M. Fry, Summit, N.J., assignor, by mesne assignments, to Engelhard Industries, Inc., Newark, N.J., a corporation of Delaware
Filed May 1, 1958, Ser. No. 732,275
6 Claims. (Cl. 204—147)

The present invention relates to a cathodic protection system for inhibiting the corrosion of metallic surfaces in contact with an electrolyte and, more particularly, for preventing the corrosion of ship hulls, in this case the electrolyte being the sea water. Cathodic protection systems also are used in connection with metallic containers, pipe lines, etc., which contain electrolytes.

Cathodic protection consists basically of applying an electrical current to an anode, immersed in an electrolyte, and to the surface to be protected as the cathode, whereby the surface potential is maintained cathodic with respect to the electrolyte, thus preventing corrosion of the surface. In the case of painted metallic surfaces such as ship hulls, however, when the impressed current density exceeds a certain amount the paint film will become damaged, whereas an insufficient current results in inadequate protection against corrosion. Therefore, an optimum exists and cathodic protection systems have been suggested, in which the fluctuating potential on the metallic surface is continuously registered and the power output to the anodes controlled accordingly, either by manually or automatically adjusting the output.

In order to automatically register the potential on the metallic surface to be protected, reference electrodes immersed in the electrolyte were used which performed, in cooperation with the metallic surface, as a voltaic cell to produce a current which was assumed to be a function of the condition of the metallic surface and was utilized to automatically adjust the output of the system. However, by constantly drawing current from this cell, the reference electrodes deteriorated within a short time and had to be replaced. Further, the reference electrodes were subjected to polarization which impaired the produced current to an extent beyond control so that, when used heretofore, such reference electrodes did not constitute a reliable means of registering the actual potential on the surface to be protected.

The present invention is concerned with a method and a system which avoids the aforementioned disadvantages and will be illustrated in connection with the cathodic protection of ships, whereby the metallic surface to be protected is the hull of the ship and the electrolyte is sea water. The reference electrode, hereinafter referred to as the reference half cell in accordance with its function, is used in such a way that no current, or an extremely low current, is drawn therefrom such that the lifetime of the cell is greatly multiplied, as compared to conventional systems, and that the registered signal is actually a function of the hull potential without being affected by undesired polarization of the reference half cell.

In accordance with the invention, a cathodic protection system is provided in which electrical power is supplied to an anode and a hull as the cathode and this power supply is automatically adjusted as a function of the potential in a sensing circuit, this term encompassing the circuit including the reference half cell and the hull, both of which are in contact with the sea water, an additional constant current source which provides an electromotive force opposed to the electromotive force generated by the reference half cell, and a sensing device appropriate to register the voltage difference resulting from both sources in the same sensing circuit. By adjusting the constant electromotive force in such a way that the two voltages are equal, but of opposite direction at the point where the hull potential reaches the desired optimum, no current will flow through the sensing device. Therefore, the method of the invention is a compensation method in which in which the constant, known electromotive force, is opposed to the unknown electromotive force generated by the reference half cell and the hull.

Figure 2:
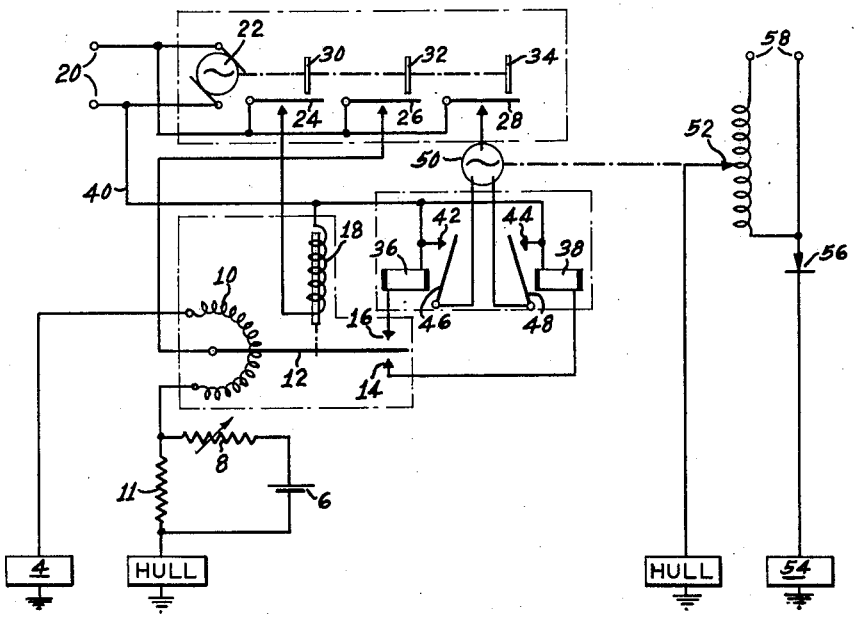
Figure 3:
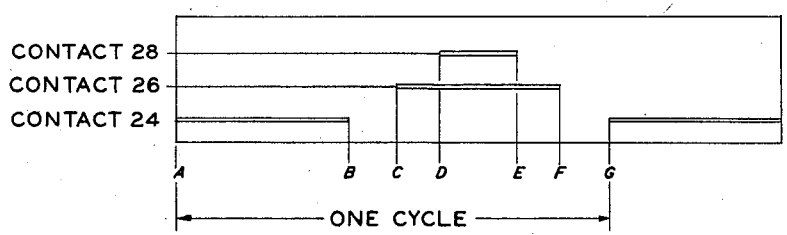

The invention will be further illustrated by reference to the accompanying drawing in which:

FIGURE 1 is a block diagram showing the relationship between the components of one embodiment of the invention, FIGURE 2 is a schematic circuit diagram of the cathodic protection system of FIGURE 1, and FIGURE 3 illustrates the operation of the three time switches of FIGURE 2.

Referring to FIGURES 1 and 2, the system for cathodically protecting the hull of a ship comprises a sensing circuit which includes the reference half cell 4, which is suitably an assembly of silver chloride deposited on silver, affixed to the hull in a protective housing so as to contact the water, but being otherwise insulated. The reference half cell 4, the hull, a constant source of electromotive force, suitably a dry-cell battery 6, a variable resistor 8 and the main coil 10 of a galvanometer type relay form the sensing circuit. The voltage drop across a fixed resistor 11 is set by the variable resistor 8, such that, when this voltage is equal to and opposite in polarity to the reference half cell potential, the potential difference in the sensing circuit is zero when the hull potential is at an optimum. Thus, no current flows through the coil 10 of the sensing relay. Upon any change of the hull potential, one of the electromotive forces will prevail over the other and a resulting, differential current will flow in one or the other direction, causing the armature 12 of the sensing relay to deviate from the zero position.

It will be understood that the conventional symbol for "ground" in the drawings stands, in the present instance, for the sea water.

It has been found that galvanometer type relay of microampere sensitivity, able to withstand currents of several milliamperes, is a suitable device for the purpose of the invention, when provided with two contacts 14 and 16 at either side of the armature 12 and having a resetting device. Such device consists of a coil 18 which is mechanically coupled to brackets (not shown) adapted to return the armature 12 back to the zero position thereof, even when the main coil 10 is energized by a resulting differential current in the sensing circuit. The force of the resetting device being sufficient to overcome the torque produced by the current in the coil 10 or a possible sticking of the armature 12 to one of the contacts 14 or 16, a maximum assurance of flawless performance of the sensing relay is guaranteed. The resetting coil is energized periodically and intermittently from an independent power supply 20. By means of a motor 22 driving three time switches 24, 26 and 28, actuated by three cams 30, 32 and 34, respectively, the resetting coil 18 is energized by the closing of the switch 24 as described heretofore, whereas the time switches 26 and 28 actuate the portions of the control circuit, as described below.

The signals emitted when the sensing relay armature 12 contacts either the contact 14 or the contact 16 are used to energize a circuit system which controls the adjustment of the current of an output circuit. This is accomplished by connecting the contact 16 to the coil 36 and the contact 14 to the coil 38 of a pair of relays, hereinafter referred to as reversing relays and which are energized by the power source 20 through the conductor 40. The other branch of the circuit energizing reversing relay 36 or 38 over contact 16 or 14, respectively, is periodically and intermittently interrupted by the time switch 26 operated by the cam 32.

As illustrated in FIGURE 3, the cams 30 and 32 perform in such a way that, during one complete cycle *a–g* of about 1 to 3 minutes, both contacts 24 and 26 are actuated to close their respective circuits intermittently, but each during the de-energized interval of the other. Since the contact 24 energizes the resetting device of the sensing relay in the time interval *a–b*, no current flows through the contacts 14 and 16 when the resetting device operates since the contact 26 is open. During the interval *b–g*, the resetting device being de-energized, the armature 12 is free to move in response to the current condition in the main coil and assumes a position in contact with either one of the contacts 14 or 16 as a function of the direction of the resulting differential current in the sensing circuit, or remains in the zero position when no current flows through the coil 10 because the hull potential is at the optimum. During the time *c–f*, which is a portion of the time *b–g*, the time switch contact 26 is actuated to close; hence, reversing relay coil 36 or 38 will be energized as selected by the armature 12 of the sensing relay. Since the armature remains in the zero position when no current flows through the coil 10, neither of the reversing relay coils 36 nor 38 is energized in this case.

The contacts 42 and 44 cooperating with the armatures 46 and 48 are connected in the energizing circuit of a reversible motor 50 in such a way that the motor is rotated in one direction when the relay coil 36 is energized to close the contact 42, 46 whereas by the closing of contact 44, 48 the motor is rotated in the opposite direction. The third cam-operated contact 28 is inserted in the power supply line to the motor 50 and is actuated only during the time interval *d–e* (FIGURE 3) which is a portion of the time *c–f*. Therefore, the motor 50 is energized when one of the contact pairs 42, 46 or 44, 48 is closed and only in the time interval *d–e*, when the contact 28 is also closed. Consequently, the direction of rotation of the motor is a function of the resulting differential current in the sensing circuit, depending upon whether the sensing relay armature 12 energizes the reversing relay coil 36 or 38. If no current flows in the sensing relay coil 10, neither of the contacts 14, 16 will be selected and therefore no power will be supplied to the motor 50.

The contact arm 52 of a variable auto-transformer is mechanically coupled to the motor 50 by means of a gear or any other conventional means (not shown) thereby adjusting the number of turns added as secondary windings in the power output circuit, which comprises an anode 54, the hull, a rectifier 56 and which is connected to a current source at 58.

When operating, the cathodic protection system continuously supplies power from the supply 58 to the anode 54 and to the hull as a function of the direction of the resulting differential current in the sensing circuit, whereby a periodical re-adjustment of the power is effected. The control components are energized only when the opposed electromotive forces in the sensing circuit are not balanced, thereby increasing or decreasing the power supply whereas, when the hull reaches a predetermined optimum, no readjustment occurs and the power output remains the same as in the previous cycle *a–g*.

Referring to FIGURE 3 which shows the relationship between the portions of one cycle of the time switches, it has been found advantageous to operate under conditions such that all the relay contacts are without current at the moment of either opening or closing. Thus, at the time *b*, when the resetting coil releases the armature 12 to move towards the contacts 14 or 16, the circuit through the selected contact and through the armature 12 is still interrupted by the switch contact 26. Only at the time *c*, when the relay armature has already assumed one of the deflected positions, does contact 26 close the circuit. At the end of the time interval *c–f*, contact 26 opens the circuit before the resetting coil 18 is energized, which occurs at the time *a*, and again at the time *g* to start a new cycle. Likewise, the contact 28 supplies power to the motor in the time interval *d–e* only, which falls entirely within the interval *c–f*. If the motor 50 is to be energized at the time *d*, one of the contacts 42, 46 or 44, 48 is already closed and remains closed until time *f*, which is past the energized interval *d–e* of the motor. As a result of this arrangement, none of the relay contacts of the system conducts current at the moment of closing or opening, whereby the formation of sparks is practically excluded and the lifetime of all the relays, as well as the reliability of the system, is greatly increased. Furthermore, the time interval *b–c* is reserved for the armature 12 to find a position corresponding to the current conditions in the sensing circuit. Similarly, the motor 50 comes to a complete rest in each cycle before being actuated again in the subsequent cycle.

Many modifications of the cathodic protection system according to the invention are possible. The resulting differential current in the sensing circuit can be utilized, for example, for biasing the grid potential of a suitable electron tube, which registers the direction of the current and thereby controls the power in the output circuit. In the output circuit, a rheostat of similar structure can be substituted for the auto-transformer, whereby the input current at 58 is taken from a direct current source and the rectifier 56 is omitted. The cam-actuated time switches 24, 26 and 28 can be replaced by commutators cooperating with contact springs, or any other equivalent devices.

However, it has been found that the cathodic protection system as described fulfills to a large extent the requirements for a device to be installed on ships and handled by untrained personnel. By transforming the electrical signal into mechanical energy and mechanically adjusting the power output, the three circuit systems, i.e. the sensing circuit, the control circuit and the output circuit, are electrically separated from each other and are monitored by fuses, pilot lights, etc. (not shown). Hence, any disturbance in the function of the system can be readily detected, located and repaired.

This application is a continuation-in-part of application Serial Number 513,511, filed June 6, 1955, now abandoned.

It will be obvious to those skilled in the art that many modifications may be made within the scope of the present invention without departing from the spirit thereof, and the invention includes all such modifications.

What is claimed is:

1. A cathodic protection system for inhibiting the corrosion of a metallic surface in contact with an electrolyte, in which electrical power is continuously supplied to an output circuit and automatically adjusted to maintain the surface potential at a predetermined optimum, comprising a sensing circuit, a control circuit and an output circuit; the sensing circuit including the said metallic surface as a cathode and a reference half cell immersed in the electrolyte, a source of electromotive force opposed to and adjusted to reduce to zero the electromotive force generated by the reference half cell when the surface potential reaches the predetermined optimum, and a galvanometer-type sensing relay having first and second contacts, the relay armature cooperating with the first contact when the electromotive force generated by the reference half cell exceeds that of the opposed source, and cooperating with the second contact when the opposed electromotive force exceeds that generated by the reference half cell; the control circuit including a first and second reversing relay, the first reversing relay being energized by closing the first sensing relay contact whereby a reversible motor is caused to rotate in one direction and the second reversing relay being energized by closing the second contact whereby the motor is caused to rotate in the opposite direction, the motor being mechanically coupled to means for adjusting the power supplied in the output circuit, the sensing relay being provided with an electrical resetting device which is periodically and intermittently energized by a time switch.

2. A system according to claim 1 including a plurality of time switches, wherein a first time switch is adapted to periodically and intermittently energize the resetting device of the sensing relay, a second time switch adapted to periodically and intermittently energize the reversing relays within the de-energized intervals of the first time switch and a third time switch adapted to energize the reversible motor within the energized intervals of the second time switch.

3. A system according to claim 2 in which the time switches are operated by cams.

4. A method for cathodically protecting a metallic surface in contact with an electrolyte which comprises continuously supplying electrical power to an anode and to the metallic surface as the cathode, generating an electromotive force between a reference half cell and the metallic surface, opposing the generated electromotive force with a constant electromotive force such that the resulting electromotive force amounts to zero when the potential on the metallic surface reaches a predetermined optimum, registering the direction of the resulting differential electromotive force as a signal in an electrical circuit, automatically transforming the obtained signal into mechanical energy and adjusting the power supplied to the anode and to the metallic surface as a function of the signal, the signal circuit being energized periodically and intermittently, and the resulting differential electromotive force being periodically re-registered during the de-energized intervals.

5. A method according to claim 4 in which the electrical signal is transformed into mechanical energy during a portion of the energized period of the signal circuit.

6. In a cathodic protection system for inhibiting the corrosion of a metallic surface in contact with an electrolyte, an anode and a reference half cell immersed in said electrolyte, means for continuously applying electrical power between said surface and said anode, means for adjusting the level of said power supply, a bucking source of electromotive force in circuit opposition to the cell formed by said half cell and said surface for balancing at a predetermined voltage the electromotive force generated by said cell, sensing means responsive to the current direction in said bucking circuit for automatically energizing said adjusting means as a function of said direction, and means for periodically and intermittently locking said sensing means into a non-responsive condition, whereby said adjusting means is energized intermittently and periodically only during the responsive intervals of said sensing means and without interrupting the protective current.

References Cited in the file of this patent

UNITED STATES PATENTS

| | | |
|---|---|---|
| 926,312 | Baker | June 29, 1909 |
| 2,221,997 | Polin | Nov. 19, 1940 |
| 2,479,390 | McNairy | Aug. 16, 1949 |
| 2,621,671 | Eckfeldt | Dec. 16, 1952 |
| 2,624,701 | Austin | Jan. 6, 1953 |
| 2,640,957 | MacGeorge et al. | June 2, 1953 |
| 2,758,079 | Eckfeldt | Aug. 7, 1956 |
| 2,759,887 | Miles | Aug. 21, 1956 |

OTHER REFERENCES

Pearson et al.: "The Petroleum Engineer," Ref. Annual, 1943, pages 168–180.

Henderson: Corrosion. vol. 9. 1953. pp. 216–220.